United States Patent
Otsuka et al.

(10) Patent No.: US 9,660,459 B2
(45) Date of Patent: May 23, 2017

(54) VOLTAGE REGULATOR AND POWER RECEIVING APPARATUS

(71) Applicant: Kabushiki Kaisha Toshiba, Minato-ku, Tokyo (JP)

(72) Inventors: Masafumi Otsuka, Kawasaki Kanagawa (JP); Hirotoshi Aizawa, Kawasaki Kanagawa (JP); Takaya Yasuda, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 445 days.

(21) Appl. No.: 14/479,680

(22) Filed: Sep. 8, 2014

(65) Prior Publication Data

US 2015/0263533 A1    Sep. 17, 2015

(30) Foreign Application Priority Data

Mar. 12, 2014    (JP) .................................. 2014-049210

(51) Int. Cl.
*H02J 5/00*    (2016.01)
*G05F 1/56*    (2006.01)
(Continued)

(52) U.S. Cl.
CPC ................ *H02J 5/005* (2013.01); *G05F 1/56* (2013.01); *G05F 1/575* (2013.01); *H02J 7/025* (2013.01)

(58) Field of Classification Search
CPC ... H02J 5/00; H02J 7/025; H02J 5/005; G05F 1/56; G05F 1/575; G05F 3/02; G05F 3/06; G05F 1/10; G05F 3/26
See application file for complete search history.

(56) References Cited

U.S. PATENT DOCUMENTS 8,169,203 B1 *    5/2012    Vemula .................... G05F 1/575
                                                                    323/273
8,268,560 B2 *    9/2012    Uhlmann ............. C07K 14/003
                                                                    435/6.1
(Continued)

FOREIGN PATENT DOCUMENTS

JP    2007-226392 A    9/2007
JP    2013-003699 A    1/2013
JP    2013-003700 A    1/2013

OTHER PUBLICATIONS

Korean Office Action issued on Nov. 12, 2015 in corresponding Korean Application No. 10-2014-0116853, along with English translation thereof.

(Continued)

*Primary Examiner* — Rexford Barnie
*Assistant Examiner* — Terrence Willoughby
(74) *Attorney, Agent, or Firm* — White & Case LLP (57) ABSTRACT

The voltage regulator includes a resistor circuit that switches between a first state and a second state according to the comparison result signal. In the first state, a resistance between a second end of a first controlling transistor and a fixed potential is set at a first resistance, and a second end of a second controlling transistor and the fixed potential are disconnected from each other. In the second state, the second end of the first controlling transistor and the fixed potential are disconnected from each other, and a resistance between the second end of the second controlling transistor and the fixed potential is set at a second resistance.

20 Claims, 4 Drawing Sheets (51) Int. Cl.
G05F 1/575 (2006.01)
H02J 7/02 (2016.01)

(56) References Cited

U.S. PATENT DOCUMENTS

2009/0021219 A1* 1/2009 Yoda .................. H02J 7/025
                                                320/137
2011/0298280 A1* 12/2011 Homol ................ H03F 3/72
                                                307/31
2012/0205978 A1* 8/2012 Wong ................. G05F 1/56
                                                307/31

OTHER PUBLICATIONS

Taiwanese Office Action issued on Nov. 25, 2015 in corresponding Taiwanese Applicatiion No. 103129377, along with English translation there.
Chinese Office Actiion issued on Mar. 25, 2016 in corresponding Chinese Application No. 201410446793.X, along with English translation thereof.

* cited by examiner

VOLTAGE REGULATOR AND POWER RECEIVING APPARATUS

CROSS-REFERENCE TO RELATED APPLICATION

This application is based upon and claims the benefit of priority from the prior Japanese Patent Application No. 2014-049210, filed on Mar. 12, 2014, the entire contents of which are incorporated herein by reference.

BACKGROUND

Field

Embodiments described herein relate generally to a LDO voltage regulator and a power receiving apparatus.

Background Art

Some conventional LDO voltage regulators have a current detecting transistor for detecting the output current in addition to the output transistor. In operation of the LDO voltage regulator, the detecting transistor and the sensing transistor are completely turned on and serve as switches.

In general, in order to use both the output transistor and the detecting transistor in the LDO voltage regulator that passes a high current, the resistance ratios have to perfectly agree with each other to ensure pair properties. However, pair properties cannot be ensured because of the large size of the output transistor, so that it is difficult to use both the output transistor and the detecting transistor in the LDO voltage regulator.

Depending on the size of the output transistor, the current density may vary, and the resistance of the device may be variable.

Therefore, accurate current detection cannot be achieved if the input voltage varies, and the drain-source voltage of the output transistor significantly varies.

DETAILED DESCRIPTION

A voltage regulator according to an embodiment includes an output transistor that is connected to a power supply terminal at a first end of a current path thereof and to an output terminal, at which the output voltage is output, at a second end of the current path thereof, a first voltage being supplied to the power supply terminal. The voltage regulator includes a first detecting transistor that is connected to the power supply terminal at a first end of a current path thereof and to a gate of the output transistor at a gate thereof. The voltage regulator includes a first controlling transistor that is connected to a second end of the current path of the first detecting transistor at a first end of a current path thereof. The voltage regulator includes a first amplifying circuit that controls a gate voltage of the first controlling transistor so as to make a voltage at the second end of the current path of the output transistor and a voltage at the second end of the current path of the first detecting transistor equal to each other. The voltage regulator includes a second detecting transistor that is connected to the power supply terminal at a first end of a current path thereof and to the gate of the output transistor at a gate thereof. The voltage regulator includes a second controlling transistor that is connected to a second end of the current path of the second detecting transistor at a first end of a current path thereof. The voltage regulator includes a second amplifying circuit that controls a gate voltage of the second controlling transistor so as to make the voltage at the second end of the current path of the output transistor and a voltage at the second end of the current path of the second detecting transistor equal to each other. The voltage regulator includes a third amplifying circuit that controls a gate voltage of the output transistor so as to make a first reference voltage and the output voltage equal to each other. The voltage regulator includes a comparator that compares the first voltage and the output voltage, and outputs a comparison result signal that is based on a result of the comparison. The voltage regulator includes a resistor circuit that includes a first resistor having a first resistance between the second end of the current path of the first controlling transistor and a fixed potential and a second resistor having a second resistance between the second end of the current path of the second controlling transistor and the fixed potential.

A detected voltage that is based on a voltage at the second end of the current path of the first controlling transistor is output at an output node in a first case where the potential difference between the first voltage and the output voltage is equal to or greater than a reference value.

A detected voltage that is based on a voltage at the second end of the current path of the second controlling transistor is output at the output node in a second case where the potential difference is smaller than the reference value.

In the following, embodiments will be described with reference to the drawings.

First Embodiment

Figure 1:
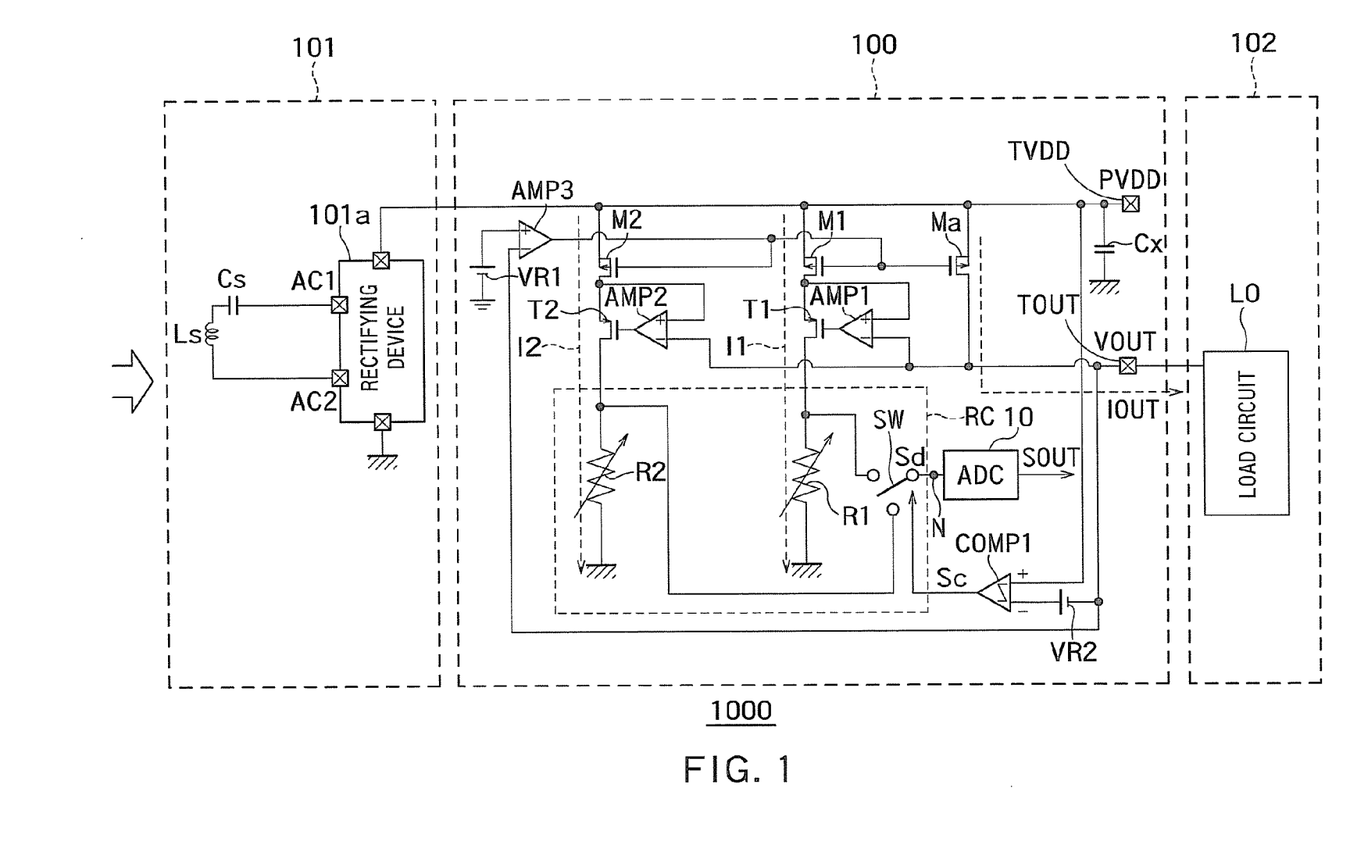
FIG. 1 is a circuit diagram showing an example of a configuration of a power receiving apparatus 1000 according to a first embodiment.

FIG. 1 is a circuit diagram showing an example of a configuration of a power receiving apparatus 1000 according to a first embodiment.

As shown in FIG. 1, the power receiving apparatus 1000 is configured to receive electric power output from a power transmitting apparatus (not shown).

The power receiving apparatus 1000 is a portable apparatus with a built-in battery, such as a smart phone or a tablet PC, or a battery charging apparatus to be connected to the apparatus, for example. However, the power receiving apparatus 1000 may be any other apparatus that receives electric power output from a corresponding power transmitting apparatus, such as a rechargeable electric car, a rechargeable household electric appliance or a rechargeable apparatus for underwater application.

Power transmission from the power transmitting apparatus to the power receiving apparatus 1000 is achieved by electromagnetically coupling a power transmitting coil (a primary coil) provided in the power transmitting apparatus and a power receiving coil (a secondary coil) "Ls" provided in the power receiving apparatus 1000 to form a power transmission transformer. In this way, non-contact power transmission can be achieved.

As described above, the power receiving apparatus 1000 receives electric power transmitted from the power transmitting apparatus by wireless power supply, rectifies the obtained current and outputs the rectified current.

As shown in FIG. 1, the power receiving apparatus 1000 includes a power receiving part 101, an LDO voltage regulator 100 and a load part 102, for example.

The power receiving part 101 includes the power receiving coil "Ls", a power receiving capacitor "Cs" and a rectifying device 101a.

The power receiving coil "Ls" is connected between a first power receiving terminal "AC1" and a second power receiving terminal "AC2" and is electromagnetically coupled to the power transmitting coil in the power transmitting apparatus.

The power receiving capacitor "Cs" is connected in series with the power receiving coil "Ls" between the first power receiving terminal "AC1" and the second power receiving terminal "AC2".

The rectifying device 101a rectifies the voltage between the first power receiving terminal "AC1" and the second power receiving terminal "AC2" and supplies the rectified voltage to a power supply terminal "TVDD".

The LDO voltage regulator 100 outputs an output voltage "VOUT", which is generated from the voltage at the power supply terminal "TVDD", at an output terminal "TOUT".

The output voltage "VOUT" is supplied to a load circuit "LO". The load circuit "LO" is a charging circuit that charges a battery or a system IC, for example.

As shown in FIG. 1, the LDO voltage regulator 100 includes the power supply terminal "TVDD", the output terminal "TOUT", an output transistor "Ma", a first detecting transistor "M1", a first controlling transistor "T1", a first amplifying circuit "AMP1", a second detecting transistor "M2", a second controlling transistor "T2", a second amplifying circuit "AMP2", a comparator "COMP1", a third amplifying circuit "AMP3", a resistor circuit "RC" and an analog-to-digital converting circuit 10, a capacitor "Cx", for example.

A power supply voltage "PVDD" is supplied to the power supply terminal "TVDD" from the power receiving part 101. The capacitor "Cx" is connected between the power supply terminal "TVDD" and the ground potential.

The output voltage "VOUT" is output at the output terminal "TOUT".

The output transistor "Ma" is connected to the power supply terminal "TVDD" at one end (a source) thereof and to the output terminal "TOUT" at another end (a drain) thereof.

The first detecting transistor "M1" is connected to the power supply terminal "TVDD" at one end (a source) thereof and to a gate of the output transistor "Ma" at a gate thereof. A current "I1", which is a mirror current of an output current "IOUT" flowing through the output transistor "Ma", flows through the first detecting transistor "M1".

The size of the first detecting transistor "M1" is set to be smaller than the size of the output transistor "Ma".

The first controlling transistor "T1" is connected to another end (a drain) of the first detecting transistor "M1" at one end (a source) thereof.

The first amplifying circuit "AMP1" controls the gate voltage of the first controlling transistor "T1" so as to make the voltage at the another end (the drain) of the output transistor "Ma" and the voltage at the another end (the drain) of the first detecting transistor "M1" equal to each other.

The second detecting transistor "M2" is connected to the power supply terminal "TVDD" at one end (a source) thereof and to the gate of the output transistor "Ma" at a gate thereof. A current "I2", which is a mirror current of the output current "IOUT" flowing through the output transistor "Ma", flows through the second detecting transistor "M2".

The size of the second detecting transistor "M2" is set to be smaller than the size of the output transistor "Ma".

The second controlling transistor "T2" is connected to another end (a drain) of the second detecting transistor "M2" at one end (a source) thereof.

The second amplifying circuit "AMP2" controls the gate voltage of the second controlling transistor "T2" so as to make the voltage at the another end (the drain) of the output transistor "Ma" and the voltage at the another end (the drain) of the second detecting transistor "M2" equal to each other.

The third amplifying circuit "AMP3" controls the gate voltage of the output transistor "Ma" so as to make a first reference voltage "VR1" and the output voltage "VOUT" equal to each other.

The comparator "COMP1" receives the power supply voltage "PVDD" at a non-inverting input terminal thereof and a voltage that is the output voltage "VOUT" plus a second reference voltage (a reference value) "VR2" at an inverting input terminal thereof. The comparator "COMP1" outputs a comparison result signal "Sc" in accordance with these inputs.

Specifically, the comparator "COMP1" compares the potential difference between the power supply voltage "PVDD" and the output voltage "VOUT" with the reference value and outputs the comparison result signal "Sc" that is based on the comparison result.

In response to the comparison result signal "Sc", for example, the resistor circuit "RC" enters a first state (1) where a resistance between another end (a drain) of the first controlling transistor "T1" and a fixed potential is set at a first resistance.

In the first state (1), the resistor circuit "RC" outputs a detected voltage "Sd" that is based on the voltage at the another end (the drain) of the first controlling transistor "T1" at an output node "N" thereof.

The resistor circuit "RC" switches to the first state (1) described above in a case where the comparison result signal "Sc" indicates that the potential difference is equal to or greater than the reference value.

In response to the comparison result signal "Sc", for example, the resistor circuit "RC" enters a second state (2) where a resistance between the another end (the drain) of the second controlling transistor "T2" and the fixed potential is set at a second resistance.

In the second state (2), the resistor circuit "RC" outputs the detected voltage "Sd" that is based on the voltage at the another end (the drain) of the second controlling transistor "T2" at the output node "N" thereof.

The resistor circuit "RC" switches to the second state (2) described above in a case where the comparison result signal "Sc" indicates that the potential difference is smaller than the reference value.

As described above, the resistor circuit "RC" switches between the first state (1) and the second state (2) in response to the comparison result signal "Sc".

The fixed potential described above is a ground potential, for example.

The first resistance described above is determined so as to set the voltage at the another end (the drain) of the first controlling transistor "T1" at a preset target value in the first state (1), for example.

The second resistance described above is determined so as to set the voltage at the another end (the drain) of the second controlling transistor "T2" at the target value described above in the second state (2) described above.

As shown in FIG. 1, the resistor circuit "RC" includes a first variable resistor "R1", a second variable resistor "R2" and a switch circuit "SW", for example.

The first variable resistor "R1" is connected to the another end (the drain) of the first controlling transistor "T1" at one end thereof and to the fixed potential at another end thereof. The resistance of the first variable resistor "R1" is set at the first resistance described above.

The second variable resistor "R2" is connected to the another end (the drain) of the second controlling transistor "T2" at one end thereof and to the fixed potential at another end thereof. The resistance of the second variable resistor "R2" is set at the second resistance described above.

In the first state (1) described above, based on the comparison result signal "Sc", the switch circuit "SW" connects the another end (the drain) of the first controlling transistor "T1" and the output node "N" to each other and disconnects the another end (the drain) of the second controlling transistor "T2" and the output node "N" from each other.

On the other hand, in the second state (2) described above, based on the comparison result signal "Sc", the switch circuit "SW" disconnects the another end (the drain) of the first controlling transistor "T1" and the output node "N" from each other and connects the another end (the drain) of the second controlling transistor "T2" and the output node "N" to each other.

As described above, based on the comparison result signal "Sc", the switch circuit "SW" switches between the first state (1) where the another end (the drain) of the first controlling transistor "T1" and the output node "N" are connected to each other and the another end (the drain) of the second controlling transistor "T2" and the output node "N" are disconnected from each other and the second state (2) where the another end (the drain) of the first controlling transistor "T1" and the output node "N" are disconnected from each other and the another end (the drain) of the second controlling transistor "T2" and the output node "N" are connected to each other.

That is, based on the comparison result signal "Sc", the resistor circuit "RC" switches the state of the switch circuit "SW", thereby switching between the first state (1) and the second state (2).

In this way, as described later, the first and second controlling transistors "T1" and "T2" and the resistor circuit "RC" are adjusted by switching between the first and second detecting transistors "M1" and "M2" in response to the potential difference between the power supply voltage "PVDD" and the output voltage "VOUT". As a result, detection can be achieved with an improved accuracy even if the voltage difference between the power supply voltage "PVDD" and the output voltage "VOUT" varies. That is, in the case of wireless power supply that involves a variation of the value of the power supply voltage "PVDD" in response to the current value, detection can be achieved with an improved accuracy over a wider range of current values.

The analog-to-digital converting circuit 10 analog-to-digital converts the detected voltage "Sd" and outputs an output signal "SOUT".

The output signal "SOUT" contains information on the output current "IOUT" and is used for calculation of the electric power received by the power receiving apparatus 1000.

Next, an example of operating characteristics of the LDO voltage regulator 100 configured as described above will be described.

Figure 2:
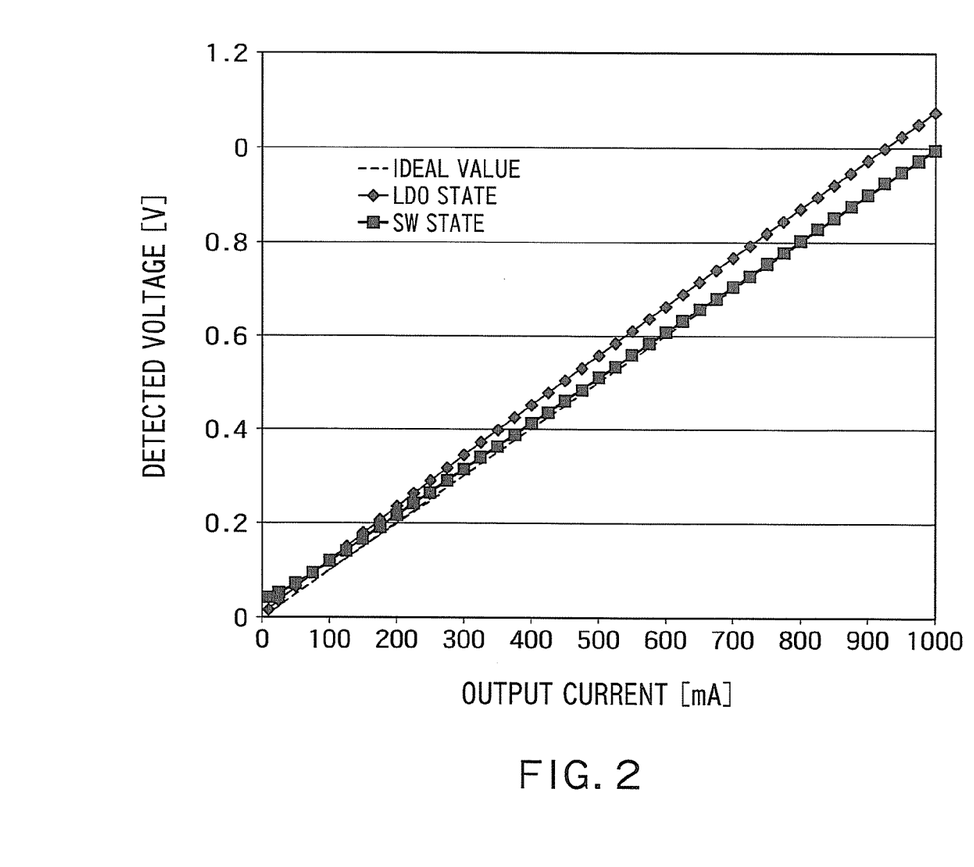
FIG. 2 is a diagram showing an example of a relationship between the output current and the detected voltage of an LDO voltage regulator according to a comparative example.
Figure 3:
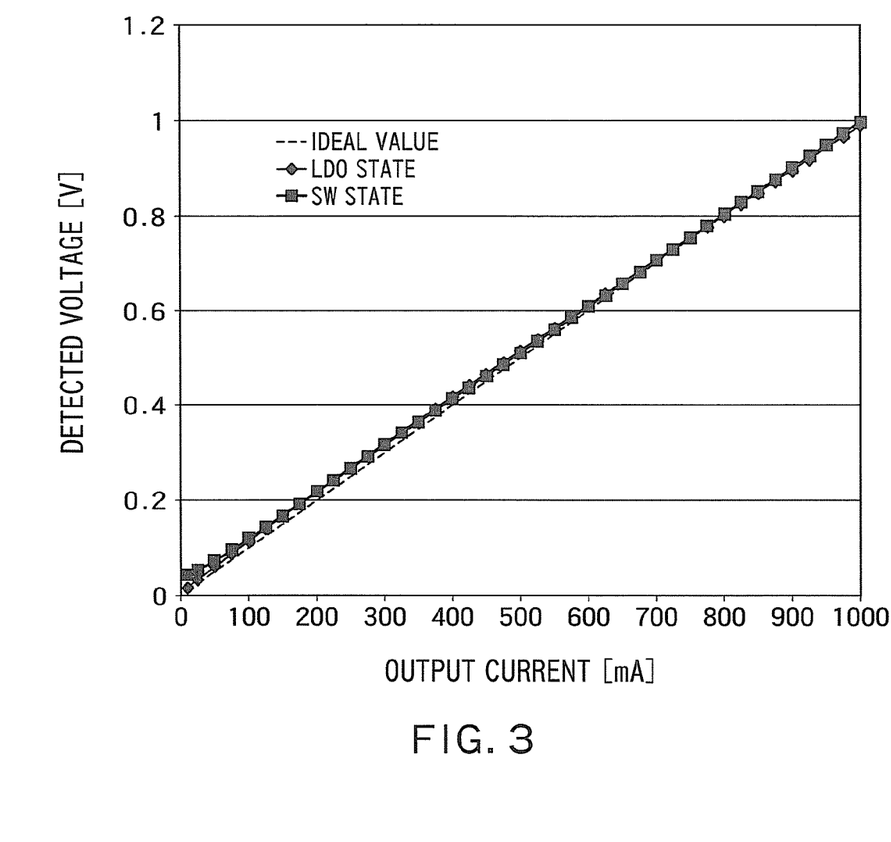
FIG. 3 is a diagram showing an example of a relationship between the output current and the detected voltage of the LDO voltage regulator according to the first embodiment.

FIG. 2 is a diagram showing an example of a relationship between the output current and the detected voltage of an LDO voltage regulator according to a comparative example. FIG. 3 is a diagram showing an example of a relationship between the output current and the detected voltage of the LDO voltage regulator according to the first embodiment. In FIGS. 2 and 3, an LDO state refers to a state where a source-drain voltage of an output transistor is high, and an SW state refers to a state where the source-drain voltage of the output transistor is low and a switching operation occurs.

As shown in FIG. 2, in the comparative example, the first and second controlling transistors are not adjusted. Therefore, the detected voltage is higher than the ideal value in the LDO state where the voltage difference between the power supply voltage "PVDD" and the output voltage "VOUT" is large, although the detected voltage is close to the ideal value in the SW state where the voltage difference is small. That is, the accuracy of current detection varies depending on the voltage difference between the power supply voltage "PVDD" and the output voltage "VOUT".

On the other hand, according to this embodiment, as can be seen from FIG. 3, the first and second controlling transistors "T1" and "T2" and the resistor circuit "RC" are adjusted in response to the conditions, and the current detection characteristics are improved in each state. That is, the influence of the voltage difference between the power supply voltage "PVDD" and the output voltage "VOUT" on the accuracy of current detection is reduced.

As described above, the LDO voltage regulator according to the first embodiment can conduct accurate current detection even if the input voltage varies.

Second Embodiment

Figure 4:
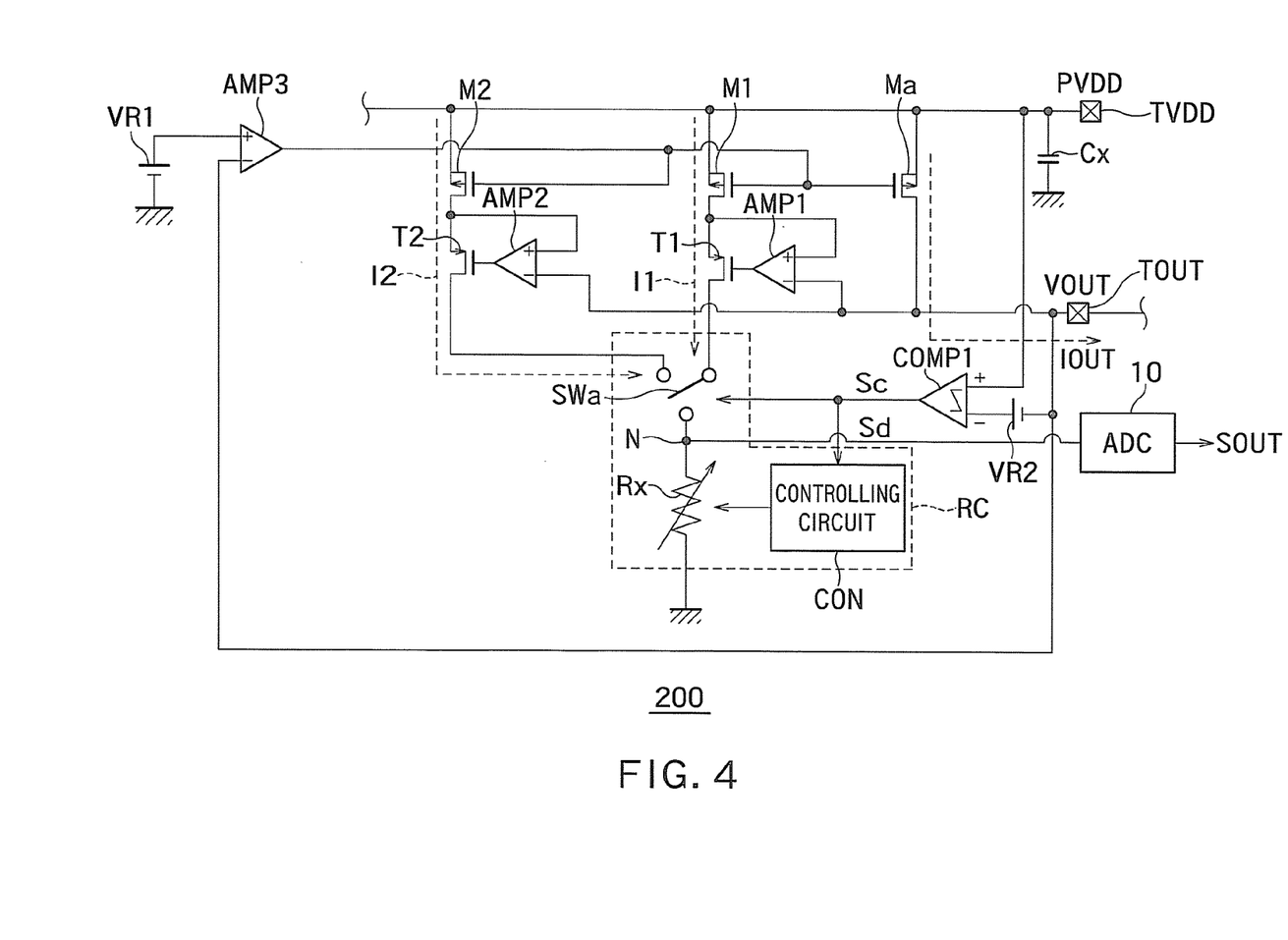
FIG. 4 is a circuit diagram showing an example of a configuration of an LDO voltage regulator 200 according to a second embodiment.

FIG. 4 is a circuit diagram showing an example of a configuration of an LDO voltage regulator 200 according to a second embodiment. In FIG. 4, the same reference symbols as those in FIG. 1 denote the same components as those in the first embodiment, and descriptions thereof will be omitted. The LDO voltage regulator 200 is incorporated in the power receiving apparatus 1000 as with the LDO voltage regulator 100 shown in FIG. 1.

As shown in FIG. 4, as with the LDO voltage regulator 100 according to the first embodiment, the LDO voltage regulator 200 includes the power supply terminal "TVDD", the output terminal "TOUT", the output transistor "Ma", the first detecting transistor "M1", the first controlling transistor "T1", the first amplifying circuit "AMP1", the second detecting transistor "M2", the second controlling transistor "T2", the second amplifying circuit "AMP2", the comparator "COMP1", the third amplifying circuit "AMP3", the resistor circuit "RC" and the analog-to-digital converting circuit 10.

As in the first embodiment, the resistor circuit "RC" switches between the first state (1) described above and the second state (2) described above in response to the comparison result signal "Sc".

As shown in FIG. 4, the resistor circuit "RC" includes a variable resistor "Rx", a switch circuit "SWa" and a controlling circuit "CON", for example.

The variable resistor "Rx" is connected to the output node "N" at one end thereof and to the fixed potential (the ground potential, for example, as described above) at another end thereof.

Based on the comparison result signal "Sc", the switch circuit "SWa" switches between the first state (1) where the another end (the drain) of the first controlling transistor "T1"

and the output node "N" are connected to each other and the another end (the drain) of the second controlling transistor "T2" and the output node "N" are disconnected from each other and the second state (2) where the another end (the drain) of the first controlling transistor "T1" and the output node "N" are disconnected from each other and the another end (the drain) of the second controlling transistor "T2" and the output node "N" are connected to each other.

Based on the comparison result signal "Sc" (specifically, in the case where the comparison result signal "Sc" indicates that the potential difference is equal to or greater than the reference value), in the first state (1), the controlling circuit "CON" sets the resistance of the variable resistor "Rx" at the first resistance described above.

On the other hand, based on the comparison result signal "Sc" (specifically, in the case where the comparison result signal "Sc" indicates that the potential difference is smaller than the reference value), in the second state (2), the controlling circuit "CON" sets the resistance of the variable resistor "Rx" at the second resistance described above.

As described above, the LDO voltage regulator 200 differs from the LDO voltage regulator 100 in details of the circuit configuration of the resistor circuit "RC".

The remainder of the configuration of the LDO voltage regulator 200 is the same as that of the LDO voltage regulator 100 according to the first embodiment.

The operating characteristics of the LDO voltage regulator 200 configured as described above are the same as those of the LDO voltage regulator 100 according to the first embodiment.

That is, the LDO voltage regulator according to the second embodiment can conduct accurate current detection even if the input voltage varies.

Furthermore, the LDO voltage regulator according to the second embodiment can obtain the effect of this embodiment by using only the switching of the resistance of the variable resistor "Rx". That is to say, because the resistor circuit "RC" can be adjusted based on the comparison result signal "Sc", the accuracy of current detection in the SW state and the LDO state are improved without the second detecting transistors "M2", the first controlling transistor "T1", the second amplifying circuit "AMP2", and the switch circuit "SWa".

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A voltage regulator comprising:
   an output transistor that is connected to a power supply terminal at a first end of a current path thereof and to an output terminal, at which the output voltage is output, at a second end of the current path thereof, a first voltage being supplied to the power supply terminal;
   a first detecting transistor that is connected to the power supply terminal at a first end of a current path thereof and to a gate of the output transistor at a gate thereof;
   a first controlling transistor that is connected to a second end of the current path of the first detecting transistor at a first end of a current path thereof;
   a first amplifying circuit that controls a gate voltage of the first controlling transistor so as to make a voltage at the second end of the current path of the output transistor and a voltage at the second end of the current path of the first detecting transistor equal to each other;
   a second detecting transistor that is connected to the power supply terminal at a first end of a current path thereof and to the gate of the output transistor at a gate thereof;
   a second controlling transistor that is connected to a second end of the current path of the second detecting transistor at a first end of a current path thereof;
   a second amplifying circuit that controls a gate voltage of the second controlling transistor so as to make the voltage at the second end of the current path of the output transistor and a voltage at the second end of the current path of the second detecting transistor equal to each other;
   a third amplifying circuit that controls a gate voltage of the output transistor so as to make a first reference voltage and the output voltage equal to each other;
   a comparator that compares the first voltage and the output voltage, and outputs a comparison result signal that is based on a result of the comparison; and
   a resistor circuit that includes a first resistor having a first resistance between the second end of the current path of the first controlling transistor and a fixed potential and a second resistor having a second resistance between the second end of the current path of the second controlling transistor and the fixed potential, wherein
   a detected voltage that is based on a voltage at the second end of the current path of the first controlling transistor is output at an output node in a first case where the potential difference between the first voltage and the output voltage is equal to or greater than a reference value, and
   the detected voltage that is based on a voltage at the second end of the current path of the second controlling transistor is output at the output node in a second case where the potential difference is smaller than the reference value.

2. The voltage regulator according to claim 1, wherein the first resistance and the second resistance are different from each other.

3. The voltage regulator according to claim 1, wherein the first resistance is determined so as to set the voltage at the second end of the current path of the first controlling transistor at a preset target value, in a case where the potential difference is equal to or greater than the reference value, and
the second resistance is determined so as to set the voltage at the second end of the current path of the second controlling transistor at the target value, in a case where the potential difference is smaller than the reference value.

4. The voltage regulator according to claim 1, wherein a size of the first detecting transistor is set to be smaller than a size of the output transistor, and
a size of the second detecting transistor is set to be smaller than the size of the output transistor.

5. The voltage regulator according to claim 1, wherein, in the resistor circuit,
the first resistor is a first variable resistor, and
the second resistor is a second variable resistor, and wherein the resistor circuit comprises:
a switch circuit that switches between the first case and the second case, and
in the first case, the second end of the current path of the first controlling transistor and the output node are connected to each other, and the second end of the current path of the second controlling transistor and the output node are disconnected from each other, and
in the second case, the second end of the current path of the first controlling transistor and the output node are disconnected from each other, and the second end of the current path of the second controlling transistor and the output node are connected to each other.

6. The voltage regulator according to claim 1,
wherein the resistor circuit is a variable resistor in which the first resistor and the second resistor are in common, and
the variable resistor is arranged between the output node and the fixed potential, and
the resistor circuit comprises:
a switch circuit arranged between the output node, the second end of the current path of the first controlling transistor and the second end of the current path of the second controlling transistor; and
a controlling circuit, and
wherein the controlling circuit sets the resistance of the variable resistor at the first resistance, in the first case, and
the controlling circuit sets the resistance of the variable resistor at the second resistance, in the second case, and
wherein the switch circuit connects the output node and the second end of the current path of the first controlling transistor to each other, and disconnects the output node and the second end of the current path of the second controlling transistor from each other in the first case, and
the switch circuit disconnects the output node and the second end of the current path of the first controlling transistor from each other, and connects the output node and the second end of the current path of the second controlling transistor to each other in the second case.

7. The voltage regulator according to claim 1, further comprises:
an analog-to-digital converting circuit that analog-to-digital converts the detected voltage.

8. The voltage regulator according to claim 1, wherein the comparator that compares the first voltage and the output voltage plus the reference value.

9. A voltage regulator comprising:
an output transistor that is connected to a power supply terminal at a first end of a current path thereof and to an output terminal, at which the output voltage is output, at a second end of the current path thereof, a first voltage being supplied to the power supply terminal;
a first detecting transistor that is connected to the power supply terminal at a first end of a current path thereof and to a gate of the output transistor at a gate thereof;
a first controlling transistor that is connected to a second end of the current path of the first detecting transistor at a first end of a current path thereof;
a first amplifying circuit that controls a gate voltage of the first controlling transistor so as to make a voltage at the second end of the current path of the output transistor and a voltage at the second end of the current path of the first detecting transistor equal to each other;
a third amplifying circuit that controls a gate voltage of the output transistor so as to make a first reference voltage and the output voltage equal to each other;
a comparator that compares the first voltage and the output voltage, and outputs a comparison result signal that is based on a result of the comparison; and
a variable resistor having a first resistance between the second end of the current path of the first controlling transistor and a fixed potential,
a controlling circuit that sets the resistance of the variable resistor at a first resistance, in a case where the potential difference is equal to or greater than a reference value, in response to the comparison result signal, and sets the resistance of the variable resistor at a second resistance, in a case where the potential difference is smaller than the reference value, in response to the comparison result signal, the second resistance being different from the first resistance.

10. The voltage regulator according to claim 9, further comprises:
an analog-to-digital converting circuit that analog-to-digital converts the detected voltage.

11. The voltage regulator according to claim 9, wherein the comparator that compares the first voltage and the output voltage plus the reference value.

12. A power receiving apparatus that receives electric power transmitted from a power transmitting apparatus by wireless power supply, rectifies an obtained current and outputs the rectified current, comprising:
a power receiving coil that is connected between a first power receiving terminal and a second power receiving terminal and is electromagnetically coupled to a power transmitting coil in the power transmitting apparatus;
a power receiving capacitor that is connected in series with the power receiving coil between the first power receiving terminal and the second power receiving terminal;
a rectifying device that rectifies a voltage between the first power receiving terminal and the second power receiving terminal and supplies a first voltage to a power supply terminal;
a voltage regulator that outputs an output voltage, which is generated from the first voltage at the power supply terminal, at an output terminal; and
a load circuit to which the output voltage is supplied,
wherein the voltage regulator includes:
an output transistor that is connected to a power supply terminal at a first end of a current path thereof and to an output terminal, at which the output voltage is output, at a second end of the current path thereof, the first voltage being supplied to the power supply terminal;
a first detecting transistor that is connected to the power supply terminal at a first end of a current path thereof and to a gate of the output transistor at a gate thereof;
a first controlling transistor that is connected to a second end of the current path of the first detecting transistor at a first end of a current path thereof;
a first amplifying circuit that controls a gate voltage of the first controlling transistor so as to make a voltage at the second end of the current path of the output transistor and a voltage at the second end of the current path of the first detecting transistor equal to each other;
a second detecting transistor that is connected to the power supply terminal at a first end of a current path thereof and to the gate of the output transistor at a gate thereof;

a second controlling transistor that is connected to a second end of the current path of the second detecting transistor at a first end of a current path thereof;

a second amplifying circuit that controls a gate voltage of the second controlling transistor so as to make the voltage at the second end of the current path of the output transistor and a voltage at the second end of the current path of the second detecting transistor equal to each other;

a third amplifying circuit that controls a gate voltage of the output transistor so as to make a first reference voltage and the output voltage equal to each other;

a comparator that compares the first voltage and the output voltage, and outputs a comparison result signal that is based on a result of the comparison; and a resistor circuit that includes a first resistor having a first resistance between the second end of the current path of the first controlling transistor and a fixed potential and a second resistor having a second resistance between the second end of the current path of the second controlling transistor and the fixed potential, wherein a detected voltage that is based on a voltage at the second end of the current path of the first controlling transistor is output at an output node in a first case where the potential difference between the first voltage and the output voltage is equal to or greater than the reference value, and the detected voltage that is based on a voltage at the second end of the current path of the second controlling transistor is output at the output node in a second case where the potential difference is smaller than the reference value.

13. The power receiving apparatus according to claim 12, wherein the first resistance and the second resistance are different from each other.

14. The power receiving apparatus according to claim 12, wherein the first resistance is determined so as to set the voltage at the second end of the current path of the first controlling transistor at a preset target value, in a case where the potential difference is equal to or greater than the reference value, and the second resistance is determined so as to set the voltage at the second end of the current path of the second controlling transistor at the target value, in a case where the potential difference is smaller than the reference value.

15. The power receiving apparatus according to claim 12, wherein a size of the first detecting transistor is set to be smaller than a size of the output transistor, and the size of a second detecting transistor is set to be smaller than the size of the output transistor.

16. The power receiving apparatus according to claim 12, wherein, in the resistor circuit, the first resistor is a first variable resistor, and the second resistor is a second variable resistor, and wherein the resistor circuit comprises:

a switch circuit that switches between the first case and the second case, and in the first case, the second end of the current path of the first controlling transistor and the output node are connected to each other, and the second end of the current path of the second controlling transistor and the output node are disconnected from each other, and in the second case, the second end of the current path of the first controlling transistor and the output node are disconnected from each other, and the second end of the current path of the second controlling transistor and the output node are connected to each other.

17. The power receiving apparatus according to claim 12, wherein the resistor circuit is a variable resistor in which the first resistor and the second resistor are in common, and the variable resistor is arranged between the output node and the fixed potential, and the resistor circuit comprises:

a switch circuit arranged between the output node, the second end of the current path of the first controlling transistor and the second end of the current path of the second controlling transistor; and a controlling circuit, and wherein the controlling circuit sets the resistance of the variable resistor at the first resistance, in the first case, and the controlling circuit sets the resistance of the variable resistor at the second resistance, in the second case, and wherein the switch circuit connects the output node and the second end of the current path of the first controlling transistor to each other, and disconnects the output node and the second end of the current path of the second controlling transistor from each other, in the first case, and the switch circuit disconnects the output node and the second end of the current path of the first controlling transistor from each other, and connects the output node and the second end of the current path of the second controlling transistor to each other, in the second case.

18. The power receiving apparatus according to claim 12, further comprises:

an analog-to-digital converting circuit that analog-to-digital converts the detected voltage.

19. The power receiving apparatus according to claim 12, further comprises:

a capacitor connected between the power supply terminal and the fixed potential.

20. The power receiving apparatus according to claim 12, wherein the comparator that compares the first voltage and the output voltage plus the reference value.

* * * * *